UNITED STATES PATENT OFFICE.

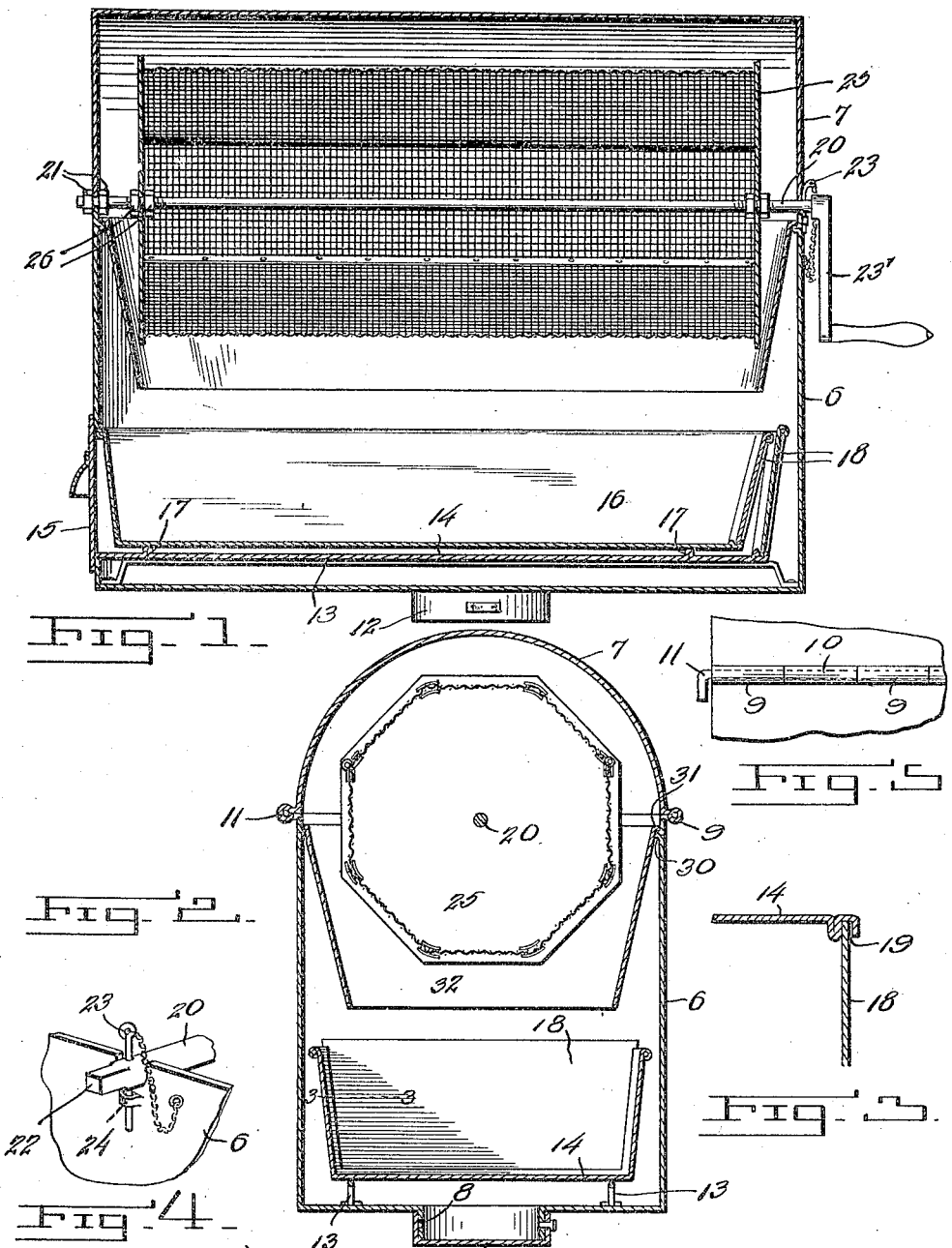

LEWIS B. SHADER, OF UNION HILL, NEW JERSEY.

ASH-SIFTER.

1,320,418.     Specification of Letters Patent.     Patented Nov. 4, 1919.

Application filed January 18, 1917. Serial No. 143,119.

*To all whom it may concern:*

Be it known that I, LEWIS B. SHADER, a citizen of the United States, residing at Union Hill, in the county of Hudson and State of New Jersey, have invented certain new and useful Improvements in Ash-Sifters, of which the following is a specification.

This invention has relation to ash sifters of the rotary drum type, and has for its particular object to provide an improved ash receiving means designed to receive the ashes as they fall from the drum and therefore prmitting the rapid and facile cleansing of the ash receiving means, as well as other objects.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a vertical longitudinal sectional view taken through a sifter constructed in accordance with the invention;

Fig. 2 is a vertical transverse section taken through the intermediate portion of the improved sifter;

Fig. 3 is a detail sectional view taken substantially upon the line 3—3 of Fig. 2;

Fig. 4 is a detail fragmentary perspective view illustrating the means for locking the sifter supporting shaft against rotation; and Fig. 5 is a detail fragmentary elevation showing the manner of connecting the casing and lid.

Referring now more particularly to the drawings, 6 indicates generally the body or casing which is adapted to contain the sifting mechanism. This casing includes a bottom portion and a lid, the latter being indicated at 7, and the bottom of the casing is provided with an opening defined by a downwardly extending flange 8. The upper longitudinal edges of the casing are provided with spaced rolled portions 9, the latter forming hinge barrels, and the corresponding edges of the cover 7 are similarly constructed as at 10, so that when the top is properly positioned upon the casing, the various hinge barrels will be in alinement, whereupon a hinge pin 11 may be inserted through the various barrels to lock the cover or lid upon the casing. When it is desired to open the casing, the pin at one side of the casing may be withdrawn, whereupon the cover or lid 7 may be swung upon the hinge formed at the opposite side thereof. The flange 8 defining the opening in the bottom of the casing may be covered by a cap 12, either frictionally secured upon the flange, or attached thereto by any suitable means.

Arranged in spaced relation within the casing and upon the bottom thereof are longitudinally disposed supporting rails 13, upon which a pan or receptacle 14 is adapted to rest. This receptacle is inserted in the casing through an opening formed in one end thereof, and the end 15 of the receptacle forms a closure for said opening. This pan, as shown in Fig. 1, is substantially equal in length to the casing, and when properly adjusted within the latter, has its longitudinal edges spaced from the side walls of the casing. A second pan 16 rests within the first mentioned pan, and rests upon upturned ribs or beads 17 in the bottom of the pan 14. The inner ends of these pans are closed by removable panels or plates 18; the latter traveling in grooves 19 formed in the ends of the side walls of said pans. This construction permits of the pans being readily emptied without inverting the pans, as the panels may be removed and the pans tilted so that the contents thereof will freely slide from the pans without creating dust.

The upper edges of the ends of the casing 6 are provided with notches as shown in Fig. 4, and within which the ends of a shaft 20 rest. These notches are arranged intermediate the extremities of said ends, and are alined as shown. The shaft 20 is provided at one end with a pair of nuts or washers 21, for engagement respectively with the inner and outer faces of the adjacent edge of the casing end so as to obviate end thrusts of the shaft 20. The opposite end of the shaft is squared as at 22 to receive a crank handle 23′ for rotating the said shaft. The said end of the shaft is also provided with a diametrically disposed opening, through which a locking pin 23 is adapted to be extended, the lower end of the said pin being adapted to extend through a bail 24 pressed outwardly from the end of the casing. It is obvious from this construction that by inserting the pin 23 through the opening in the shaft and also through the bail 24, the shaft will be held against rotation. Mounted upon the shaft 20 is a sifter drum 25. This drum is preferably octagonal in cross section, and is formed of foraminous material such as screen, as shown. The ends of the drum are formed of metallic plates, the latter being provided with central apertures through which the shaft 20 extends. The shaft is also provided with lock or jam nuts 26, one for engagement upon each side of each of the end plates of the drum, so as to prevent the latter moving longitudinally of the shaft. The drum is made octagonal so as to thoroughly agitate the cinders contained therein during rotation of the drum, whereby the ashes will be more thoroughly sifted. The upper portions of the octagonal screen is removable, as shown in Fig. 2 of the drawings, and is coupled to the other section of the screen in the same manner in which the lid 7 of the casing is secured to the bottom portion 6 thereof. This arrangement permits of the section being entirely removed from the drum, or, if desired, swung upon the hinge at either side thereof. The casing 6 is provided upon its inner surface and adjacent the upper edges thereof, with an inwardly projecting bead or rib 30, upon which an outwardly projecting flange 31 on a deflector or apron member 32 rests. This deflector member has its side and end walls disposed inwardly toward its lower open end, in order that such matter as may pass through the foraminous member may be directed into one of the pans in the bottom portion of the casing. The construction permits of the apron or deflector being readily removed when it is desired to clean the sifter.

In operation, the cap 12 is removed from the flange 8 at the bottom of the casing, whereupon the latter is seated upon a stove with the said flange extending through one of the openings thereof. The lid or cover of the casing may then be removed or thrown back and the octagonal drum may be also opened. Ashes are then poured into the drum and the drum closed and locked. The lid 7 is also then placed in proper position and locked with the pins 11. By inserting one of the pans in the bottom of the casing, the opening for said pans will be closed, and rotation of the drum by the crank 23' will cause violent agitation of the ashes within the drum. The dust created by this operation will be permitted to escape from within the casing by passing around the pan at the bottom thereof and through the opening into the stove. By reason of the fact that the casing is practically air tight, dust cannot escape from the casing except through the opening in the bottom thereof. After the ashes have been throughly sifted, the cover of the casing may be removed, and the top of the drum also detached. After the pan in the bottom of the casing has been removed and emptied, the same may be replaced, whereupon the drum 25 is rotated so that the cinders therein will be deposited in the said pan. During the filling operation, the shaft 20 is held against rotation by proper insertion of the pin 23 in the manner above described.

From this construction, it is apparent that the sifting of ashes is rendered easy, and without the dirt heretofore necessary in such operations. The parts are also constructed and arranged as to be capable of being readily separated, to permit of cleaning or renewal of the parts in case of wear or derangement.

While the present disclosure is that of what I believe to be the preferred embodiment of the invention, it is to be understood that the invention is not limited thereto, but that various changes may be made in the construction, arrangement, and proportion of parts, without departing from the spirit of the invention, as defined in the appended claim.

What is claimed is:—

In an ash sifter, a casing having a side opening, a pair of tracks on the bottom of the casing, a drawer slidable in the opening to rest upon the tracks, a pair of guide ways at one end of the drawer, said end being open, a closure plate slidable in said ways, a pair of transverse ribs on the bottom of the drawer, a pan resting on the ribs, a pair of guide ways at one end of the pan, said end being open, and a second closure plate slidable in said second ways.

In testimony whereof I affix my signature in presence of two witnesses.

LEWIS B. SHADER.

Witnesses:
G. WOHLFAHRT,
JOHN HILL.

Copies of this patent may be obtained for five cents each, by addressing the "Commissioner of Patents, Washington, D. C."